W. & H. ROSE.
FEEDING MECHANISM FOR LABEL OR WRAPPING MACHINES.
APPLICATION FILED SEPT. 9, 1910.
972,647.
Patented Oct. 11, 1910.
2 SHEETS—SHEET 1.
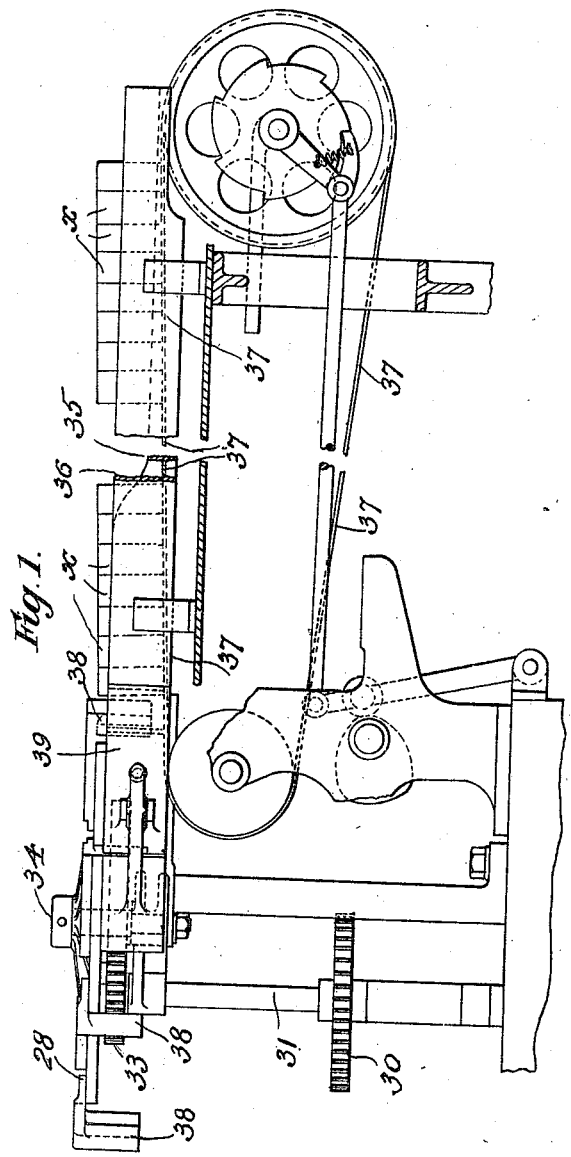
Witnesses.
G. Manning.
H. N. Ranney
Inventors
William Rose.
Henry Rose.
By Howson & Howson
attys.

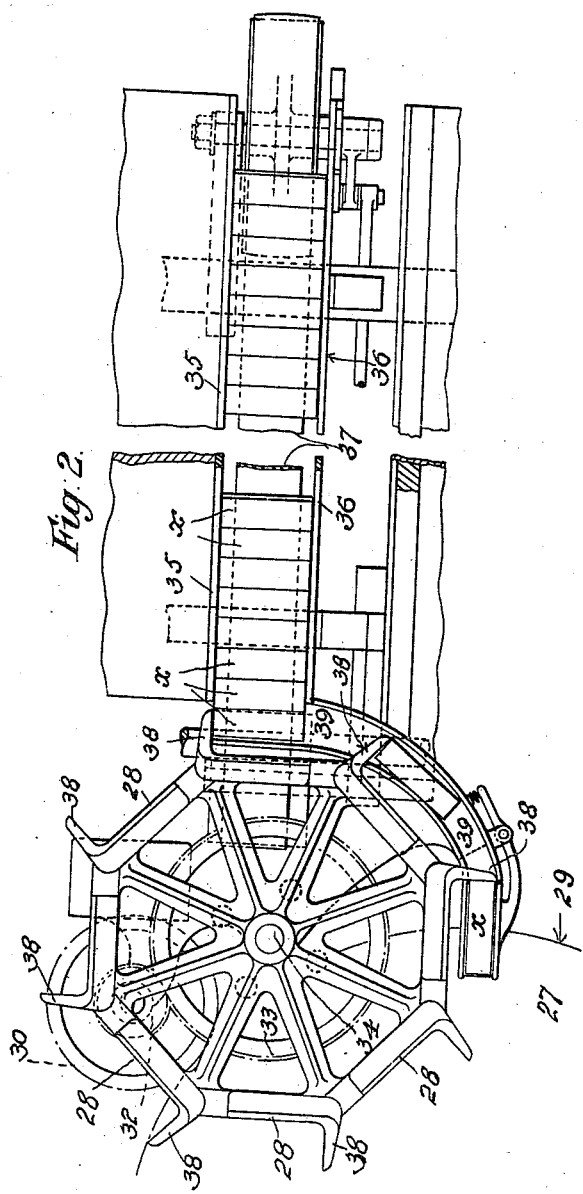

UNITED STATES PATENT OFFICE.

WILLIAM ROSE AND HENRY ROSE, OF GAINSBOROUGH, ENGLAND.

FEEDING MECHANISM FOR LABEL OR WRAPPING MACHINES.

972,647. Specification of Letters Patent. Patented Oct. 11, 1910.

Application filed September 9, 1910. Serial No. 581,140.

*To all whom it may concern:*

Be it known that we, WILLIAM ROSE and HENRY ROSE, subjects of the King of Great Britain and Ireland, both of Albion Works, Gainsborough, in the county of Lincoln, England, have invented new and useful Feeding Mechanism for Label or Wrapping Machines, of which the following is a specification.

This invention relates to apparatus described in the specification of British Letters Patent No. 27,722/07 for applying labels, or wrappers, to boxes, blocks, packages, tins, or other containers, (which we will hereinafter refer to as boxes) and consists in the combination of an improved rotary feeding device for carrying the said boxes from a feeding trough to a platform on which the boxes are delivered onto the labels, and means for intermittently driving the rotary feeding device at the same speed as the mold wheel, and a device adapted to support the boxes while being transferred from the aforesaid trough to the mold of the mold wheel.

We will particularly describe the invention with reference to the accompanying drawing, in which, Figure 1 is a side elevation with parts broken away, and Fig. 2 is a plan of so much of the apparatus as is necessary to illustrate the means employed for delivering the boxes to the mold wheel.

In the construction of the apparatus according to this invention, we employ a rotary feeder 28 (as shown in Figs. 1 and 2 of the drawing) for the purpose of feeding the boxes to be labeled, or wrapped, the said rotary feeding device being driven by any suitable gear at the same speed as the mold-wheel 27 carrying the usual molds by which the boxes and labels, or wrappers, are received for completing the folding. The said gear may, for example, as shown in the said figures, consist of a spur wheel 29 secured to, or integral with, the mold wheel 27, the said spur wheel 29 engaging with a spur wheel 30 on a vertical shaft 31 having secured to its upper end a spur pinion 32 which engages with a spur wheel 33 secured to the stud 34 onto which the rotary feeder is secured.

The boxes $x$ are preferably fed between guides 35 and 36, as shown in Figs. 1 and 2 of the accompanying drawing, to the rotary feeder 28 by an endless traveling band 37, or a floor may be arranged at an angle so that the boxes descend by gravity. The feeder 28 is provided with arms 38 which are shaped so that their ends successively convey a box $x$ through a quadrantal trough 39 which is arranged in substantially the horizontal plane of the guide and is formed with substantially concentric spaced vertical walls and a bottom, one of said walls leading to one wall of the guide and the other being spaced from the other wall of the guide to leave an open end to the trough, said trough being disposed between the place where the boxes are delivered to the action of the rotary feeder 28 and a suitable platform through a hole in which the boxes and labels, or wrappers, are fed to the molds on the usual mold-wheel, so that the boxes are delivered by the rotary feeder 28 onto the labels, or wrappers, and these are then pushed through a hole in a suitable platform into the said molds, which may be effected as shown and described in the specification of the aforesaid British Letters Patent No. 27,722 A. D. 1907, the termination of the quadrantal trough 39 having the bottom cut away to allow the boxes to pass down onto the labels, or wrappers, on the aforesaid platform.

The parts of the apparatus which we have not described are arranged and operated in accordance with the specification of the aforesaid British Patent No. 27,722/07. By the combination with the machine in accordance with the said former patent of the improvements according to the present invention we provide a machine which is more efficient in operation and which feeds the labels, or wrappers, to be applied to the boxes in a better and more simple manner.

What we claim is:—

An apparatus of the character described having in combination a guide along which the boxes are fed, a trough horizontally disposed at the delivery end of the guide and arranged substantially in the horizontal plane of said guide, said trough being quadrantal in form having vertical concentrically spaced walls and a bottom, one of said walls leading to one of the walls of said guide and the other wall of the trough extending in front of the delivery end of the guide and having its end separated from the other wall of said guide, a horizontally rotatable feeder journaled in front of the feed guide having outwardly projecting arms adapted to be carried into the open end of the quadrantal trough and directly across the delivery end of the feed-guide in a plane at right angles to the normal feed of the boxes, each of said arms directly engaging an outermost box and delivering the same edgewise into the trough and through the same and delivering the box in a plane substantially parallel with the normal feed of the box.

In testimony whereof we have signed our names to this specification in the presence of two subscribing witnesses.

WILLIAM ROSE.
HENRY ROSE.

Witnesses:
RICE K. EVANS,
CHAS. N. DANIELS.